(12) United States Patent
Lyle et al.

(10) Patent No.: US 7,953,806 B2
(45) Date of Patent: May 31, 2011

(54) TASK ASSIGNMENT AND PROGRESS MONITORING IN AN INSTANT MESSAGING SESSION

(75) Inventors: Ruthie D. Lyle, Durham, NC (US); Doris L. Jones, Sommerville, MA (US); Corinne M. Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/837,965

(22) Filed: Aug. 13, 2007

(65) Prior Publication Data

US 2009/0049131 A1 Feb. 19, 2009

(51) Int. Cl.
*G06F 15/16* (2006.01)
(52) U.S. Cl. ........ 709/206; 709/224; 709/227; 709/246; 709/248; 715/758
(58) Field of Classification Search .......... 709/204–206, 709/223, 224, 227, 246, 248; 715/751, 753, 715/758; 718/100
See application file for complete search history.

(56) References Cited

U.S. PATENT DOCUMENTS

| 2001/0013055 | A1* | 8/2001 | Kojima et al. ................ 709/205 |
|---|---|---|---|
| 2005/0240623 | A1 | 10/2005 | Kobza et al. |
| 2006/0031320 | A1 | 2/2006 | Holloway et al. |
| 2006/0143270 | A1 | 6/2006 | Wodtke et al. |
| 2006/0241996 | A1 | 10/2006 | Burger et al. |
| 2007/0043821 | A1* | 2/2007 | Brumfield ..................... 709/207 |
| 2007/0094661 | A1* | 4/2007 | Baird et al. .................... 718/102 |
| 2007/0282660 | A1* | 12/2007 | Forth ............................... 705/9 |
| 2007/0288292 | A1* | 12/2007 | Gauger ............................. 705/9 |
| 2008/0040126 | A1* | 2/2008 | Estrada et al. .................... 705/1 |
| 2008/0091782 | A1* | 4/2008 | Jakobson ...................... 709/206 |
| 2008/0163214 | A1* | 7/2008 | Rogers .......................... 718/100 |
| 2008/0209417 | A1* | 8/2008 | Jakobson ...................... 718/100 |
| 2008/0301296 | A1* | 12/2008 | York ............................. 709/225 |
| 2009/0006548 | A1* | 1/2009 | Ramanathan et al. ........ 709/204 |

OTHER PUBLICATIONS

Dollimore, J., et al; Multi-User Interfaces and Applications; WG 8.4 Conference, Heraklion, Greece, Sep. 24-26, 1990.
IBM; Project Tracking Tool; IPCOM000133679D; www.ip.com; Feb. 2, 2006.

* cited by examiner

*Primary Examiner* — Oanh Duong
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to task management in an instant messenger and provide a novel and non-obvious method, system and computer program product for task assignment and progress monitoring in an instant messaging session. In one embodiment of the invention, a method of task assignment and progress monitoring in an instant messaging session can be provided. The method can include maintaining an instant messaging session between first and second collaborators, assigning a task to the second collaborator on request of the first collaborator from within the instant messaging session, the task specifying a third collaborator external to the instant messaging session, and providing subsequent notice to the first collaborator of collaborative interactions between the second and third collaborators in respect to the assigned task.

17 Claims, 2 Drawing Sheets

TASK ASSIGNMENT AND PROGRESS MONITORING IN AN INSTANT MESSAGING SESSION

BACKGROUND OF THE INVENTION

1. Field of the Invention

The present invention relates to the field of collaborative computing and more particularly to task collaboration through instant messaging.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include document libraries, instant messaging, chat rooms, and application sharing.

Conventional collaborative computing includes combinations of collaborative technologies in order to provide a means for members of a collaborative community to pool their strengths and experiences to achieve a common goal. A collaborative computing community generally can be defined by (1) a particular context, i.e. the objective of the environment, (2) membership, i.e., the participants in the environment, (3) a set of roles for the members, and (4) resources and tools which can be accessed by the membership in furtherance of the objective of the environment. Roles are names given to the people in the environment which dictate access to the resources and tools within the environment as well as define the behavior of the community members.

Amongst often used collaborative components in a collaborative environment, instant messaging remains of paramount importance. In an instant messaging environment, one or more collaborators can exchange messages shown to be arranged in a single space visible by all. Thus, the instant messaging component aims to mimic a human-to-human conversation in which the real-time nature of the exchange of written conversation between participants can be limited only by the speed in which participants can read, digest and reply to the contributions of other contributors who are party to the instant messaging session.

Oftentimes within an instant messaging session between collaborators, one collaborator will request that the other collaborator complete a task. Ordinarily, in this circumstance, it remains incumbent upon the recipient of the request to schedule the task within the collaborative environment and to complete the task as scheduled. For the requestor, however, there is no way to determine whether or not the task has been completed. More to the point, there is no way for the requester to know even if the recipient of the request has scheduled the task. Consequently, additional points of collaboration—particularly frequent e-mails and instant messages—are required on the part of the requester to ascertain a current status of the assigned task and to determine whether or not the recipient of the request has completed the task or has progressed towards completing the task.

BRIEF SUMMARY OF THE INVENTION

Embodiments of the present invention address deficiencies of the art in respect to task management in an instant messenger and provide a novel and non-obvious method, system and computer program product for task assignment and progress monitoring in an instant messaging session. In one embodiment of the invention, a method of task assignment and progress monitoring in an instant messaging session can be provided. The method can include maintaining an instant messaging session between first and second collaborators, assigning a task to the second collaborator on request of the first collaborator from within the instant messaging session, the task specifying a third collaborator external to the instant messaging session, and providing subsequent notice to the first collaborator of collaborative interactions between the second and third collaborators in respect to the assigned task.

In one aspect of the embodiment, assigning a task to the second collaborator on request of the first collaborator from within the instant messaging session can include specifying a related collaborator for the task and associating the related collaborator with the task such that the specified related collaborator receives notice of the assigned task. In another aspect of the embodiment, assigning a task to the second collaborator on request of the first collaborator from within the instant messaging session can include selecting text in a chat transcript for the instant messaging session and incorporating the selected text into the assigned task. Finally, in yet another aspect of the embodiment, providing subsequent notice of state changes in the assigned task to the first collaborator, further can include providing subsequent notice of state changes in the assigned task to the specified related collaborator.

In another embodiment of the invention, a collaborative computing data processing system can be provided. The system can include an instant messenger configured to maintain an instant messaging session between first and second collaborators. The system also can include a task manager coupled to the instant messenger. Finally, instant messenger task assignment and monitoring logic can be provided. The logic can include program code enable to assign a task in the task manager to the second collaborator on request of the first collaborator from within the instant messaging session, the task specifying a third collaborator external to the instant messaging session, and to provide subsequent notice to the first collaborator of collaborative interactions between the second and third collaborators in respect to the assigned task.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for task assignment and progress monitoring in an instant messaging session. In accordance with an embodiment of the present invention, an instant messaging session can be established and maintained as between first and second collaborators in a collaborative environment. The first collaborator can suggest the assignment of a task to be performed by the second collaborator within text in the instant messaging session. The suggested task can implicate collaboration with a third collaborator or even additional other collaborators not party to the instant messaging session. Subsequently, the first collaborator can initiate the generation and assignment of the task to the second collaborator from within the instant messaging session in connection with the third collaborator or other collaborators and the content of the generated task can be derived from the text. Thereafter, collaborations between the second and third collaborator and other collaborators in connection with the task can be reported to the first collaborator such that the first collaborator can maintain an awareness of the progress of the assigned task.

Figure 1A:
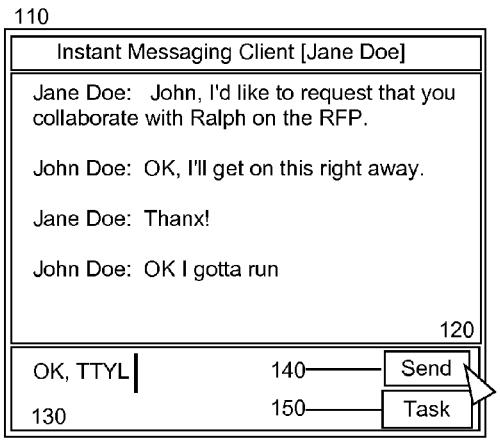
FIGS. 1A through 1C, taken together, are a pictorial illustration of an instant messenger configured for task assignment and progress monitoring.
Figure 1B:
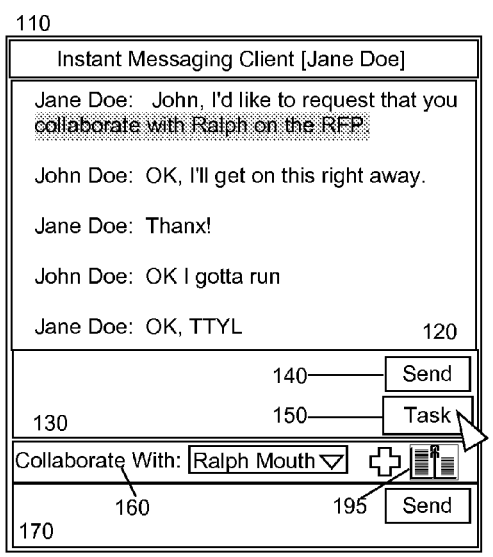
Figure 1C:
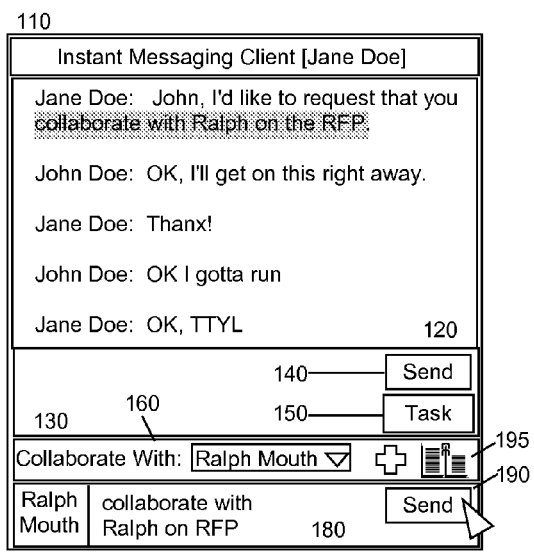

In further illustration, FIGS. 1A through 1C, taken together, are a pictorial illustration of an instant messenger configured for task assignment and progress monitoring. As shown, an instant messaging client 110 can support an instant messaging session between different collaborators. The instant messaging session can be represented within instant messaging session text 120. Individual collaborators party to the instant messaging session can provide entries to the instant messaging session text 120 through message entry field 130. Upon selecting a send control 140, content provided in the message entry field 130 can be added to the instant messaging session text 120. Notably, a task can be requested from within the instant messaging session text 120.

To initiate task generation and monitoring for the requested text in the instant messaging session text 120, however, the requested task can be selected in the instant messaging session text 120 and a task control 150 can be selected. Once selected, the task control 150 can augment the instant messaging client 110 with a collaboration control 160. The collaboration control 160 can provide a drop down list of collaborators in the collaborative environment. One or more collaborators can be selected through the collaboration control 160 to be associated with the task. Thereafter, the task selected in the instant messaging session text 120 can be copied into task subject field 170 as the task subject 180. Optionally, time picker control 195 can be activated to propose a time for completing the task. Finally, responsive to the selection of send control 190, a request for task generation can be provided to the task management component of the collaborative environment.

Once the task management component has received the request for task generation, a task can be created for completion by the designated collaborator in connection with the associated collaborator or collaborators linked to the task. Optionally, the specified completion time can be associated with the created task. Yet further, the requesting one of the collaborators also can be associated with the task. Consequently, notice to the requesting one of the collaborators can be provided in response to collaborations occurring between the designated collaborator and the associated collaborator or collaborators linked to the task. The notice can include not only an indication of the occurrence of the collaboration, but also a current state of the assigned task. Optionally, a notice can be provided in response to whether or not the task has been completed by a proposed completion time established for the task.

By way of example, the current state of the assigned task can include: Assigned, Collaboration Occurred; Collaboration Occurred from Collaborative Task; Collaboration Occurred from Collaborative Task including Body; Response Received; and Completed. Assigned is an initial state of the assigned task and Collaboration Occurred is a state arising when the designated collaborator and the associated collaborator or collaborators linked to the task engage in a collaboration such as an instant message or e-mail. Collaboration Occurred from Collaborative Task is a state arising when the observed collaboration between the designated collaborator and the associated collaborator or collaborators linked to the task engage in a collaboration initiated from the task itself indicating a high likelihood of furthering the task towards completion, whereas Collaboration Occurred from Collaborative Task including Body is a similar state where the body of the text from the originally assigned task appears within the collaboration also indicating a high likelihood of furthering the task towards completion.

Response Received is a state arising when a responsive collaboration occurs within a thread initiated by a previously observed collaboration between the designated collaborator and the associated collaborator or collaborators linked to the task. Finally, Completed is a state arising manually when the task is marked completed. In observing the state changes arising from collaborations between the designated collaborator and the associated collaborator or collaborators linked to the task, the requesting one of the collaborators can maintain an awareness of the progress of the collaborator assigned to the task in completing the task, including a likelihood that all involved collaborators have advanced the task by monitoring communications between the involved collaborators and the source from which the communications originate. In this regard, a communication originating from the task indicates a high likelihood of the involved collaborators working in furtherance of completing the task. Just the same, if the content of a communication incorporates content from the task, again there is a high likelihood of the involved collaborators working in furtherance of completing the task.

Figure 2:
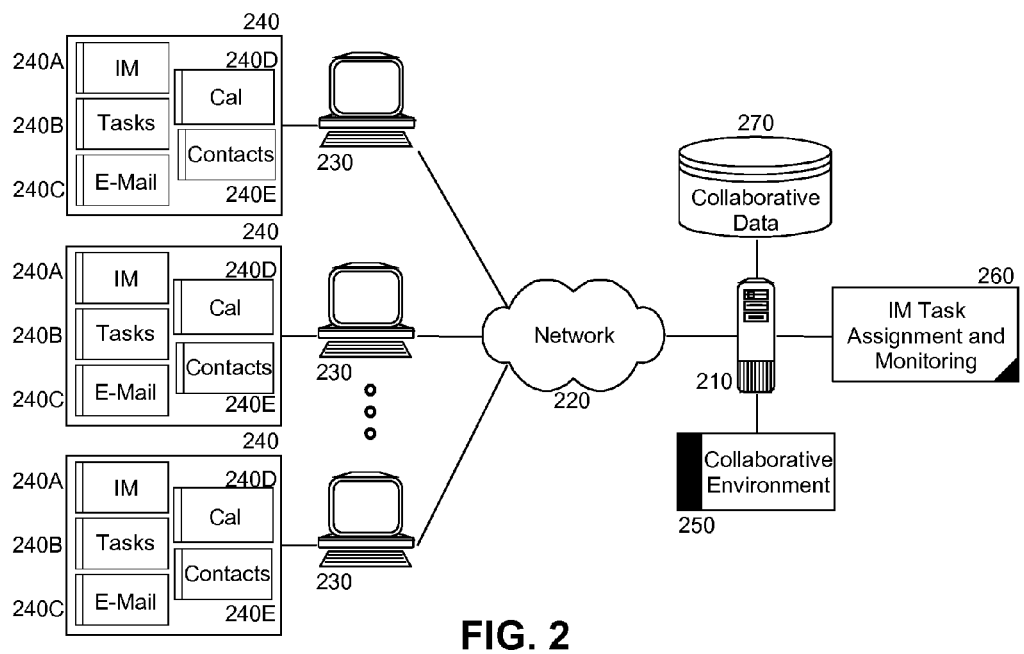
FIG. 2 is a schematic illustration of a collaborative computing data processing system configured for task assignment and progress monitoring in an instant messaging session; and, FIG. 3 is a flow chart illustrating a process for task assignment and progress monitoring in an instant messaging session.

The task assignment and progress monitoring process described herein can be embodied within a collaborative computing environment. In illustration, FIG. 2 schematically depicts a collaborative computing data processing system configured for task assignment and progress monitoring in an instant messaging session. The system can include a host server 210 configured for communicative coupling to one or more collaborative clients 230 over computer communications network 220. The host server 210 can support the operation of a collaborative environment 250 serving each of the collaborative clients 230 and managing collaborative data 270 for the collaborative clients 230.

Each of the collaborative clients 230 can provide a collaborative application 240. The collaborative application 240 can include, for example, an instant messenger 240A, a task manager 240B, an e-mail manager 240C, a calendar 240D and a contact manager 240E. It will be recognized by the skilled artisan, however, that any or all of the functional portions of the collaborative application 240 can be disposed in host server 210 as part of the collaborative environment 250 and provided to a lightweight client in collaborative client 230 such as a Web browser over the computer communications network 220.

Notably, instant messaging task assignment and monitoring logic 260 can be coupled to the collaborative environment 250 through host server 210. The logic 260 can include program code enabled to allow collaborators to an instant messaging session to assign tasks to co-collaborators based upon tasks suggested in the text of the instant messaging session. The program code of the logic 260 further can be enabled to monitor the assigned tasks as progress is measured towards completion of the assigned tasks by the co-collaborators. The progress can be reflected within a portion of the instant messenger 240A dedicated to tracking assigned tasks, within the task manager 240B, within the calendar 240D, or within the contact manager 240E.

Figure 3:
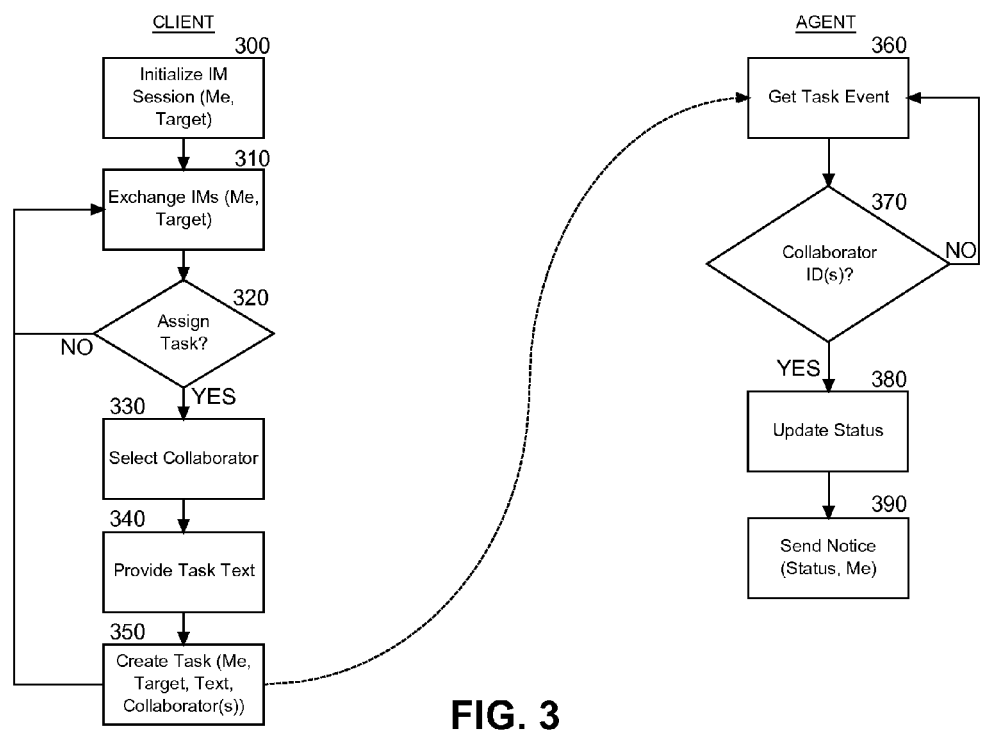

In yet further illustration of the operation of portions of the instant messaging task assignment and monitoring logic 260, FIG. 3 is a flow chart illustrating a process for task assignment and progress monitoring in an instant messaging session. Beginning in block 300, an instant messaging session can be initialized between at least two collaborators. In block 310, instant messages can be exchanged between the collaborators and the instant messages can be aggregated into a single chat transcript displayed to the collaborators in their respective instant messaging clients.

In decision block 320, it can be determined whether a requesting one of the collaborators to the instant messaging session has requested the assignment and monitoring of a task in connection with a designated one of the collaborators to the instant messaging session. If so, in block 330, a target collaborator can be selected as an object of the task to be assigned to the designated one of the collaborators. Additionally, in block 340 task text can be provided for the task from text in the chat transcript. Finally, in block 350, a task can be generated for the designated one of the collaborators according to the task text. The target collaborator further can be associated with the task as can the requesting one of the collaborators as listener collaborators for changes of state in the task.

In block 360, a task event 360 can be detected for a task in the collaborative environment. In decision block 370 it can be determined whether or not a collaboration has occurred for the task as between the designated one of the collaborators and the target one of the collaborators. In this regard, it can be determined whether an interaction such as an e-mail or instant message has been exchanged between the collaborators. If so, in block 380, the status for the collaboration can be updated to reflect the state of the task. Thereafter, in block 390, notice of the collaboration and optionally the state of the task can be provided to the listener collaborators.

Notably, the status can be helpful in ascertaining the likelihood of the collaborators having interacted in respect to the task—particularly where the interaction originates from the task. For example, where the text of the task appears in a collaboration, there is a high degree of certainty that the collaborators are furthering the completion of the task. Likewise, initiating a collaboration from the assigned task indicates a degree of certainty that the collaborators have furthered the task towards completion.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method of task assignment and progress monitoring in an instant messaging session, the method comprising:
    maintaining an instant messaging session between first and second collaborators;
    assigning in a collaborative environment executing in memory by a processor of a host server, a task to the second collaborator on request of the first collaborator from within the instant messaging session, the task specifying a third collaborator external to the instant messaging session;
    providing subsequent notice to the first collaborator of collaborative interactions between the second and third collaborators in respect to the assigned task;
    initiating a collaborative interaction between the second and third collaborators; and
    updating a state of the assigned task to notice the collaborative interaction, wherein the initiating the collaborative interaction between the second and third collaborators comprises initiating the collaborative interaction between the second and third collaborators from within the assigned task.

2. The method of claim 1, wherein assigning a task to the second collaborator on request of the first collaborator from within the instant messaging session, comprises:
    specifying a related collaborator for the task; and,
    associating the related collaborator with the task such that the specified related collaborator receives notice of the assigned task.

3. The method of claim 2, wherein providing subsequent notice of state changes in the assigned task to the first collaborator, further comprises providing subsequent notice of state changes in the assigned task to the specified related collaborator.

4. The method of claim 1, wherein assigning a task to the second collaborator on request of the first collaborator from within the instant messaging session, comprises:

selecting text in a chat transcript for the instant messaging session; and,
incorporating the selected text into the assigned task.

5. The method of claim 1, wherein initiating a collaborative interaction between the second and third collaborators from within the assigned task comprises:
selecting text in a chat transcript for the instant messaging session;
initiating a collaborative interaction between the second and third collaborators from within the assigned task; and,
incorporating the selected text into the collaborative interaction.

6. The method of claim 1, further comprising:
specifying a proposed time for completing the task; and,
providing additional subsequent notice to the first collaborator relating to whether or not the task is likely to complete by the proposed time.

7. The method of claim 1, wherein updating a state of the assigned task to notice the collaborative interaction, comprises updating a state of the assigned task to notice the collaborative interaction with an indication of a likelihood of collaborations occurring in furtherance of completing the assigned task.

8. A collaborative computing data processing system comprising:
a host computer;
an instant messenger configured to maintain an instant messaging session between first and second collaborators;
a task manager coupled to the instant messenger; and,
instant messenger task assignment and monitoring logic executing in concert with a collaborative environment executing in memory by a processor of the host computer, the logic comprising program code enable to assign a task to the second collaborator on request of the first collaborator from within the instant messaging session, the task specifying a third collaborator external to the instant messaging session, to provide subsequent notice to the first collaborator of collaborative interactions between the second and third collaborators in respect to the assigned task, to initiate a collaborative interaction between the second and third collaborators, and to update a state of the assigned task to notice the collaborative interaction, wherein the initiate the collaborative interaction between the second and third collaborators comprises initiate the collaborative interaction between the second and third collaborators from within the assigned task.

9. The system of claim 8, wherein the assigned task comprises task copied from a portion of a chat transcript for the instant messaging session.

10. The system of claim 8, wherein the assigned task is associated with a related collaborator from within the instant messaging session such that the related collaborator receives notice of the assigned task.

11. A computer program product comprising a non-transitory computer usable medium embodying computer usable program code for task assignment and progress monitoring in an instant messaging session, the computer program product comprising:
computer usable program code for maintaining an instant messaging session between first and second collaborators;
computer usable program code for assigning a task to the second collaborator on request of the first collaborator from within the instant messaging session, the task specifying a third collaborator external to the instant messaging session;
computer usable program code for providing subsequent notice of collaborative interactions between the second and third collaborators in respect to the assigned task;
computer usable program code for initiating a collaborative interaction between the second and third collaborators; and
computer usable program code for updating a state of the assigned task to notice the collaborative interaction, wherein the computer usable program code for initiating the collaborative interaction between the second and third collaborators comprises computer usable program code for initiating the collaborative interaction between the second and third collaborators from within the assigned task.

12. The computer program product of claim 11, wherein the computer usable program code for assigning a task to the second collaborator on request of the first collaborator from within the instant messaging session, comprises:
computer usable program code for specifying a related collaborator for the task; and,
computer usable program code for associating the related collaborator with the task such that the specified related collaborator receives notice of the assigned task.

13. The computer program product of claim 12, wherein the computer usable program code for providing subsequent notice of state changes in the assigned task to the first collaborator, further comprises computer usable program code for providing subsequent notice of state changes in the assigned task to the specified related collaborator.

14. The computer program product of claim 11, wherein the computer usable program code for assigning a task to the second collaborator on request of the first collaborator from within the instant messaging session, comprises:
computer usable program code for selecting text in a chat transcript for the instant messaging session; and,
computer usable program code for incorporating the selected text into the assigned task.

15. The computer program product of claim 11, wherein the computer usable program code for initiating a collaborative interaction between the second and third collaborators from within the assigned task comprises:
computer usable program code for selecting text in a chat transcript for the instant messaging session;
computer usable program code for initiating a collaborative interaction between the second and third collaborators from within the assigned task; and,
computer usable program code for incorporating the selected text into the collaborative interaction.

16. The computer program product of claim 11, further comprising:
computer usable program code for specifying a proposed time for completing the task; and,
computer usable program code for providing additional subsequent notice to the first collaborator relating to whether or not the task is likely to complete by the proposed time.

17. The computer program product of claim 11, wherein the computer usable program code for updating a state of the assigned task to notice the collaborative interaction, comprises computer usable program code for updating a state of the assigned task to notice the collaborative interaction with an indication of a likelihood of collaborations occurring in furtherance of completing the assigned task.

* * * * *